United States Patent [19]
Frister

[11] 3,782,853

[45] Jan. 1, 1974

[54] FAN BLADE ASSEMBLY

[75] Inventor: Manfred Frister, Schwieberdingen, Germany

[73] Assignee: Robert Bosch GmbH, Stuttgart, Germany

[22] Filed: Oct. 8, 1971

[21] Appl. No.: 187,748

[30] Foreign Application Priority Data
Oct. 9, 1970   Germany................. P 20 49 679.1

[52] U.S. Cl.................. 416/132, 416/186, 416/240
[51] Int. Cl............................................ F04d 17/08
[58] Field of Search................... 416/132, 186, 223, 416/240; 415/141

[56] References Cited
UNITED STATES PATENTS

| | | | |
|---|---|---|---|
| 1,954,811 | 4/1934 | Gunn | 416/240 X |
| 2,351,516 | 6/1944 | Jandasek | 416/132 |
| 2,370,600 | 2/1945 | Wightman | 416/132 |
| 2,406,499 | 8/1946 | Jandasek | 416/132 |
| 2,766,964 | 10/1956 | Almquist et al. | 415/141 |
| 3,116,696 | 1/1964 | Deters | 415/141 X |

FOREIGN PATENTS OR APPLICATIONS

| | | | |
|---|---|---|---|
| 1,004,764 | 3/1957 | Germany | 416/240 |
| 66,665 | 1/1926 | Sweden | 416/186 |
| 280,189 | 11/1914 | Germany | 416/135 |
| 2,013,481 | 10/1970 | Germany | 416/132 |
| 865,169 | 4/1961 | Great Britain | 416/132 |

*Primary Examiner*—Everette A. Powell, Jr.
*Attorney*—Michael S. Striker

[57] ABSTRACT

A fan blade assembly comprises a circular mounting plate which is rotatable about an axis. A plurality of blades are arranged spaced from each other about the axis of rotation and define between each pair of adjacent blades a passage for air passing therethrough. The blades have free moving ends which are deflected in response to the rotation of the mounting plate. During rotation of the mounting plate, the free ends of the blades are deflected towards an adjacent blade to thereby decrease the cross-sectional area of the passage for the air. With increasing rotational speed of the mounting plate, the cross-sectional area of the passage decreases to thereby reduce the drag on the blades while maintaining the amount of air moved by the fan blade assembly.

15 Claims, 9 Drawing Figures

PATENTED JAN 1 1974 3,782,853
SHEET 1 OF 3

INVENTOR
Manfred FRISTER
BY
his ATTORNEY

INVENTOR
Manfred FRISTER
BY his ATTORNEY

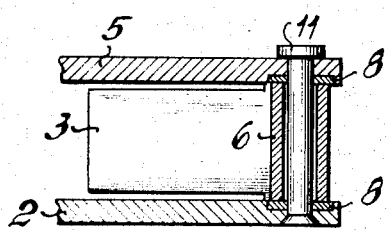
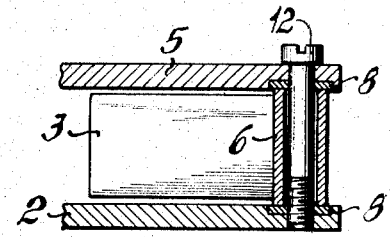
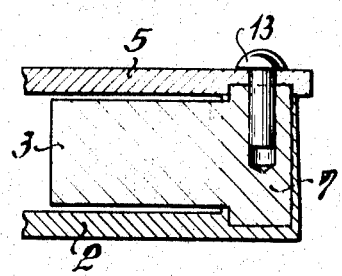
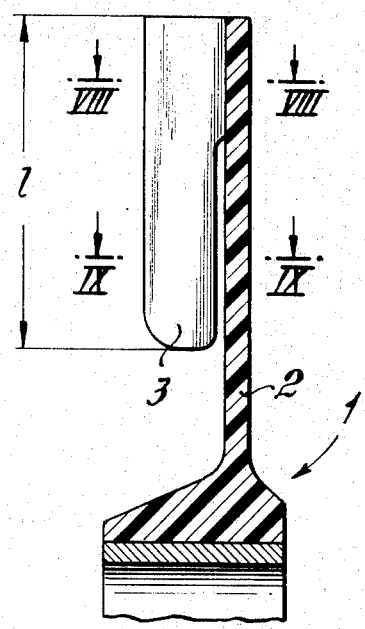
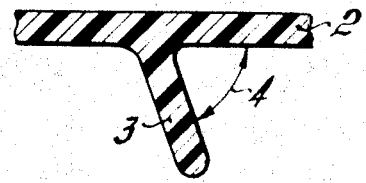
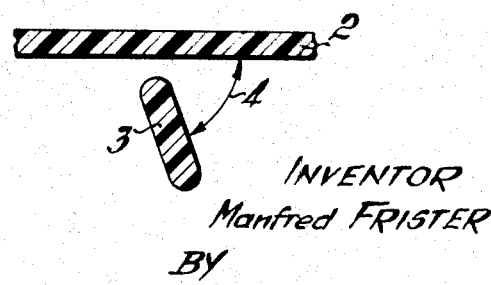

FAN BLADE ASSEMBLY

BACKGROUND OF THE INVENTION

The present invention relates to a fan for an electrical machine, in particular for an A.C. generator of a motor vehicle.

Fan blades used to date in connection with fans for electrical machines have been predominantly made of rigid construction. The stiff-bladed fans of the prior art were often so dimensioned that they provided sufficient cooling air at rotating speeds of the electrical machine to remove the heat generated by the electrical machine. However, in order to generate a sufficient amount of cooling air, the fan blades had to be so designed that they also caused a substantial drag on the machine which was rotating it. This drag on the electrical machine, e.g. an electrical generator, resulted in the machine operating at lower efficiencies. As the rotational velocity of the electrical machine increased, the fan blades being of a rigid construction, the drag components on the machine increased substantially with increasing speed. Although the heat losses generally also increase with the rotational speed of an electrical machine, the increase in heat generated is generally less in proportion to the additional amount of air generated by the rigid-bladed fan. For this reason, the prior-art rigid-bladed fans have generated greater amounts of cooling air at higher speeds than necessary and have simultaneously adversely affected the efficiency of the machine.

SUMMARY OF THE INVENTION

Accordingly, it is an object of the present invention to provide a fan blade assembly which does not have the disadvantages found in the prior-art assemblies.

It is another object of the present invention to provide a fan blade assembly, which is simple in construction and inexpensive to manufacture, to cool electrical machines, in particular electric generators, while requiring the minimum amount of driving power for a required amount of cooling irrespective of the rotational speed at which the machine is rotating.

It is a further object of the present invention to provide a fan blade assembly in which the blades can be integrally formed with the mounting plate, the blades having free ends which are movable in response to the rotation of the mounting plate to generate a sufficient amount of cooling air at higher rotational velocities while keeping the rotational drag to a minimum.

It is yet another object of the present invention to provide a fan blade assembly having pairs of blades cooperating with one another whereby the blades deflect to control the quantity of cooling air generated, the rotational drag generated by said blades being controlled by the deflection of said blades until a predetermined rotational velocity is achieved, in which case one blade of each pair restricts further deflection of the other blade.

According to the present invention, a fan blade assembly comprises a mounting portion having an axis of rotation and a plurality of blade means spaced from each other about said axis of rotation. Defined by each pair of adjacent blade means is a passage for air passing therethrough. Each of said blade means is constructed and connected to the mounting portion for reducing the cross-sectional area of each passage upon increase of the speed of rotation of the mounting portion about the axis.

According to a presently preferred embodiment, the mounting portion is rotatable in a predetermined direction. The blade means comprise longitudinal blades having first ends spaced from the axis a greater distance than the opposite ends thereof. The blades have their axes positioned at lagging angles relative to the radial directions at said first ends at all speeds of rotation of the mounting portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a fragmented side elevational view showing a means for fastening the blades to the fan assembly shown in FIG. 2;

FIG. 5 is a fragmented side elevational view showing another fastening means for connecting the blades to the fan assembly shown in FIG. 2;

FIG. 6 is a fragmented side elevational view showing still another means of fastening the blades to the blade assembly shown in FIG. 2;

FIG. 7 is a fragmented side-elevational view of still another embodiment according to the present invention wherein the fan assembly is integrally formed;

FIG. 8 is a fragmented cross-sectional view taken along line VIII—VIII in FIG. 7; and FIG. 9 is a fragmented cross-sectional view taken along line IX—IX in FIG. 7.

DESCRIPTION OF THE PREFERRED EMBODIMENTS

Figure 1:
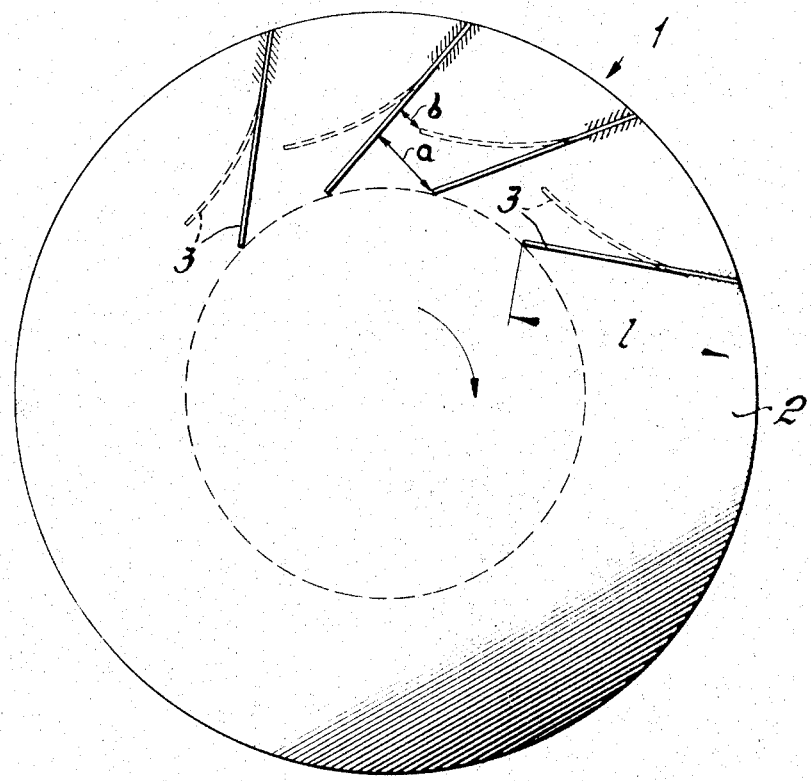
FIG. 1 is a plan view of a fan blade assembly according to the present invention, the connections of the blades to the mounting plate being shown in schematic.

Referring to the drawings, in which like reference numerals are used to designate like parts throughout, and looking first at FIG. 1, a fan blade assembly 1 according to the present invention is shown partly schematically. The fan blade assembly 1 comprises a mounting portion or plate 2 on which are mounted a plurality of fan blades 3. The mounting plate 2 consists of a substantially flat circular disk which is rotatable about its center axis. The material out of which the mounting plate 2 is made is not critical for the purposes of the present invention, any material commonly used for such purposes being suitable. According to one of the presently preferred embodiments, the mounting plate 2 is made from a metal. The only requirement for the mounting plate 2 is that it be made from a material which has limited elasticity so that it itself does not become deformed by the stresses imposed by the rotating blades 3 at the connecting points.

FIG. 1 shows an arrangement of blades according to the present invention. Only several adjacent blades 3 are shown for illustrative purposes, the blades actually being uniformly arranged about the perimeter of the mounting plate 2. The blades 3 are spaced from each other about the axis of rotation of the mounting plate as shown in FIG. 1 and define between each pair of adjacent blades 3 a passage for air passing therethrough. The passage between two adjacent blades 3 has a variable cross-sectional area as a function of speed of rotation of the mounting plate 2. Each passage is actually funnel-shaped, the narrowest area typically being formed by the free end of one blade and the length of an adjacent blade. With the mounting plate 2 stationary, the blades 3 are shown by the solid lines. After the mounting plate has achieved a predetermined velocity, the blade 3, due to both a combination of centrifugal force and the dynamic air pressures, becomes deflected and is illustrated by the dashed line. The blades 3 are made from a resilient material which is chosen to have sufficient flexibility to thereby control and limit the extent to which deflection will take place at any given rotational speed. The blades 3 can be made from any suitable material, the actual material not being critical for the present invention, but materials such as spring steel or any elastic plastic have been found suitable.

In FIG. 1, the blades 3 have been shown to be rigidly fixed to the mounting plate 2 schematically at the outer perimeters thereof. Each blade 3 is shown to have a length 1, a fraction thereof being utilized to rigidly fix the blades 3 to the mounting plate 2. Although the actual portion of the total length which is utilized to rigidly fix the blades 3 to the mounting plate 2 is not critical, lengths which have been found suitable have been lengths of from one-fourth to one-third of the total length 1.

The portions of the blades 3 which are rigidly fixed to the mounting plate 2 cannot move at all relative thereto. As a result, with increasing rotational speed of the mounting plate 2, the inner free ends of the blade 3 exhibit the maximum absolute displacement from their initial stationary positions. The displacements of other points on the blades becomes increasingly smaller as these points approach the stationary fixed ends. Clockwise rotation of the mounting plate 2 causes the blades 3 to become deflected, as explained above. The free ends of each of the blades 3 becomes deflected in the direction of the blade behind it relative to the direction of rotation, and in particular the free ends are deflected more and more towards the fixed ends, at the outer positions with increasing speeds. Since the fixed portions of the blades, and to some extent the points of the blades 3 in the regions of the fixed portions, are relatively fixed, this results in the free ends approaching the rear-positioned blades. Thus, the distance a shown in FIG. 1 represents the closest distance between two adjacent blades when the mounting plate 2 is stationary. When the mounting plate 2 has reached a predetermined rotational speed, the distance between the same two blades has now decreased as shown by distance b. These distances illustrate how the overall cross-sectional areas for the passage of air decreases with increasing rotational speeds.

By deflecting in the manner described above, the blades 3 generate less of a drag upon the electrical machine which they are cooling at higher rotational speeds while delivering a sufficient quantity of cooling air. Should a particular rotating machine require more cooling air at higher speeds, then the material out of which the blades 3 are to be constructed can be chosen to have a lower resiliency thereby to deflect less at the higher speeds and thereby to force more cooling air to be generated. In fact, by selecting the resiliency of the blades 3, provision can be made for cooling any rotating machine. If the machine generates relatively constant heat at most rotational speeds, then the resiliency of blades 3 can be selected to be relatively high so as to only generate the minimum amount of cooling air required while not generating increased drag at the higher rotational velocities.

The blades 3 shown in FIG. 1 are shown to be longitudinal, rectangular plates. However, this shape is not critical for the purposes of the present invention, and any shape for fan blades commonly used can equally be used. With the arrangement shown in FIG. 1, the blades are mounted so that the plane of the blades lie perpendicular to the plane of the mounting plate 2. However, as will be described in connection with FIGS. 7–9, other angles may be more advantageous in connection with softer materials. Therefore, when the blades 3 are made from a relatively stiff material, such as spring steel, optimum blower effectiveness can be achieved by orienting the blades at this 90° angle to the mounting plate 2.

Also, it is noted from FIG. 1, that the blades 3 do not lie along radial directions. Since the fan blade assembly in FIG. 1 is intended to rotate in a clockwise direction, the blades 3 are shown to be positioned at lagging angles relative to a radial line through the fixed ends of the blades 3. This orientation of the blades result in better aerodynamic properties for the fan 1 and is especially suitable when the fan blade assembly is only intended to rotate in one direction. However, the present invention also contemplates the use of the fan blades mounted in radial directions, such orientation being suitable for reversible fans.

The present invention has thus far been described in connection with flexible blades which are rigidly fixed to a mounting plate and which are intended to be deflected in response to rotary motion of the mounting plate. However, the same effect can be achieved by utilizing stiff blades and pivotally mounting the blades, e.g. at the same places where the blades were shown fixed in FIG. 1, so that the entire blade becomes equally displaced angularly. In such cases, however, biassing means must be utilized for urging the blades to return to their initial stationary positions. The quantity of air-drag properties which could be controlled by the resiliency of the blades in the flexible-blade embodiments can here be controlled by the resiliency of the biasing spring. In both cases, the innermost free ends approach the relatively fixed ends of an adjacent blade to decrease the effective cross-sectional areas of the passages for the passing air. By moving less air, less drag is generated. In the case of the stiff-blade embodiments, different spring arrangements can be utilized. Thus, one possible arrangement is to utilize a helical spring at the pivot point with one leg thereof abutting a stationary pin on the mounting plate 2 and the other leg thereof bearing against the rigid blade. Another possible arrangement could make use of a flat leaf spring which is rigidly mounted on the mounting plate at one end, the other end bearing against the blade, preferably in the region of the pivot point. Although the embodiments wherein the blades are rigidly fixed to the mounting plate are simpler and more economical to manufacture, the use of pivoted rigid blades which are spring-biased offers the advantage that means can be provided for interchanging the springs or changing the degree of spring bias to thereby alter the characteristics of the fan blade assembly at different rotational speeds.

Figure 2:
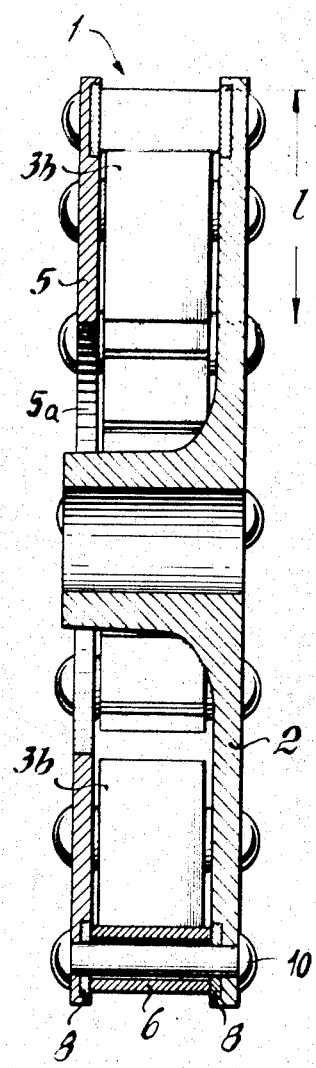
FIG. 2 is a side elevational view of another embodiment according to the present invention, shown in cross-section along the line II—II in FIG. 3.
Figure 3:
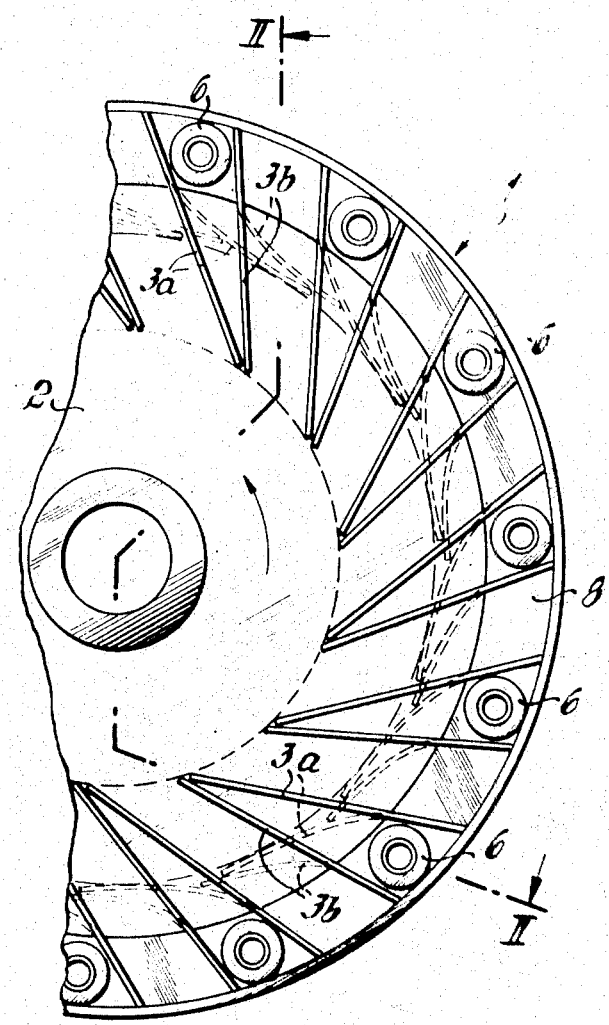
FIG. 3 is a fragmented plan view of the embodiment shown in FIG. 2.

FIGS. 2 and 3 show different views of another embodiment of the present invention. In these two Figures, the mounting plate 2 is a substantially flat circular disk having a hub portion for mounting on a rotating shaft. Blades 3a and 3b are shown both in their stationary and in their dynamic positions. An annular disk 5 is mounted to the mounting plate 2 and separated therefrom by a predetermined distance by spacers 6. Washers 8 are situated on each side of the spacers 6. Rivets 10 pass through the spacers 6 and are used to fasten the annular disk 5 and the mounting plate 2. The actual fastening means used is not critical and any suitable fastening means can be used. Some examples of possible fastening means are illustrated in FIGS. 4–6. Thus, FIG. 4 shows the annular disk 5 and the mounting plate 2 fastened by a rivet 11 passing through the spacer 6. In FIG. 5 a threaded screw 12 passes through the spacer 6 and is meshed with a threaded portion in the blade 3. The mounting plate 2 in FIG. 6 is provided with an integral boss 7 which projects upwardly from the flat portion of the mounting plate 2 a distance equalling the height of the spacers 6 in the prior examples. The annular disk 5 is fastened to the blade 3 by a pin 13 which becomes secured within a bore in boss 7 after it has been urged therein.

Still referring to FIGS. 2 and 3, it is noted that the annular disk 5a has a central cut-out area 5 which permits the passage of air therethrough. The radial dimension of the annular disk 5, namely the distance 1, is selected so as to cover the blades 3a and 3b. Although it is not necessary to totally cover these blades, it is advantageous to do so for several reasons. By covering the blades, there is less danger of accidentally touching the blades while they are in motion and thereby prevent serious accidents. Another advantage is that by decreasing the total area of the opening 5a, the blown air is concentrated to thereby result in very high exit velocities of the cooling air towards the rotating portions of the electrical machine.

The embodiment shown in FIGS. 2 and 3 is especially suitable where the velocity of the electrical machine is to be varied over considerable ranges. Referring particularly to FIG. 3, blades 3a and 3b are shown to be positioned to form a V-shaped configuration. Each of the blades consists of a substantially straight blade similar to those which were described in connection with the embodiment shown in FIG. 1. In the embodiment shown in FIG. 3, the contemplated direction of rotation of the fan blade assembly is in the counterclockwise direction. Since only one direction is contemplated for the fan blade assembly, the fan blades 3a and 3b are again angled from the radial positions for reasons described above. However, since the direction of rotation is now in the opposite sense, the blades are angled in lagging positions in the opposite directions. The blades 3a and 3b are fastened to the mounting plate 2 in any manner previously described in connection with FIG. 1, the blades being made from a flexible material. The fixed ends are spaced as shown in FIG. 3, and the free ends of the blades, which are closer to the axis of rotation, meet in the region of the vertex of the V-shaped configuration. By arranging the blades in this fashion, two adjacent blades now cooperate and act as a unit to accomplish the regulation of air movement while maintaining minimum possible drag on the electrical machine. In order for the free ends to meet as shown in FIG. 3, it is necessary that the forward blade in relation to the direction of rotation be slightly longer than the rearward blade.

The normal position of the blades 3a and 3b are shown by the solid lines in FIG. 3. As in FIG. 1, a minimum cross-sectional area is defined between each pair of adjacent blades. As the mounting plate increases in its rotational velocity, the blades having a mass, they deflect in response to centrifugal force and the dynamic air pressures to attain a new position, shown by the dashed line, at a predetermined velocity. In attaining the position at the predetermined velocity, the forward blade 3a, in particular the free end thereof, bears against and moves along the rear-positioned blade 3b towards the end of the blade 3b. Once blade 3b has been sufficiently flexed, it tends to resist further flexing and any tendency of the forward blades 3a to flex further is defeated by the action of the blades 3b. Thus, while initially flexing with relative facility as the blades in FIG. 1, the embodiment shown in FIG. 3 exhibits the property that at a predetermined higher velocity, representing a minimum cross-sectional area for the passage of air, the fan blade assembly resists the further cut-off or decrease of the passage cross-sectional areas. This property may be desirable in the instance of a rotating machine which nominally rotates within a preset range of rotational speeds in which the heat generation is substantially constant. However, should the machine increase its speed further with accompanying increased heat generation, it may then be desirable to increase the amount of cooling air available rather than maintain it at a constant value. In fact, by selecting the lengths, resiliency, shapes, and stationary stress conditions, it is possible to program a multitude of cooling air versus rotational speed relationships.

The spacers 6 shown in FIG. 3 to be positioned between the pairs of cooperating blades 3a and 3b serve to mount the annular disk 5 to the mounting plate 2. For this purpose, the spacers 6 must not be positioned between two cooperating blades but can be mounted between pairs of cooperating blades. However, the spacers 6 or other pins mounted on the mounting plate 2 may be conveniently utilized as stops for the forward or rear blades to attain particular blower characteristics at a particular rotational velocity.

The use of an annular disk 5 as shown in FIG. 2 also permits the connection of the blades 3a and 3b to both the mounting plate 2 and to the annular disk 5. By connecting the blades rigidly at two sides as shown in FIG. 2 the stresses in the blades are more uniformly distributed, this resulting in longer blade life as well as in improved blower characteristics.

As with conventional prior-art fan blade assemblies, improved performance can be achieved by equally loading all the blades of the fan. This can be accomplished by uniformly arranging the blades about the axis of rotation as shown in FIGS. 1 and 3, controlling the dimensions and the resiliency of all the blades so that they are substantially all equal.

The means of connection of the blades to the mounting plate 2, shown schematically in FIG. 1, is not critical and any method such as soldering, welding, riveting or screw-fastening can be utilized. In connection with the rigidly fixed flexible blades, it is important that the material out of which the blades are made can resist fatigue or elastic breakdown after repeated flexing. Where higher requirements, such as in connection with the life of the fan, are required the blades can be mounted at two ends as shown in FIG. 2. This arrangement, as explained above, distributes the stresses more evenly and consequently the resistance to fatigue becomes less critical.

FIG. 7 illustrates a fan blade assembly constructed from an elastic plastic material which is integrally formed. Here, the mounting plate 2 as well as the blades 3 can be integrally formed as by injection molding. In this case, the elastic or plastic material chosen must have a relatively high resistance against fatigue and elastic breakdown since the blades 3 must undergo extended and repeated flexing. FIG. 8 shows a cross-sectional area at a point where the blade 3 is connected to the mounting plate 2. It is noted that the blade 3 is oriented at an angle 4, which is less than 90°, with the mounting plate 2. As mentioned in connection with the stiffer blades in FIG. 1, the angle 4 there was selected to be 90°. However, with softer materials angle 4 should be selected to be less than 90° since the plane of the blade will tend to pivot in response to the dynamic air pressures during the rotation of the mounting plate 2. In fact, the softer the material out of which the fan blade assembly is constructed, the smaller should the angle 4 be made. In this manner, the free end of the blade 3 flexes as described in connection with the embodiment shown in FIG. 1, and the plane of the blade pivots to increase the angle 4 in response to rotation of the mounting plate 2. FIG. 9 shows a cross-section of the free end or movable portion of the blade 3 in the stationary position. As such, the angle 4 in FIG. 9 is equal to the angle 4 in FIG. 8, the entire blade 3 lying in a common plane when the mounting plate 2 is stationary.

It will be understood that each of the elements described above, or two or more together, may also find a useful application in other types of fans differing from the types described above.

While the invention has been illustrated and described as embodied in a fan blade assembly for rotating electrical machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A fan blade assembly comprising a mounting portion having an axis of rotation; and a plurality of resiliently flexible blade means arranged spaced from each other about said axis of rotation and defining between each pair of adjacent blade means a passage for air passing therethrough, each of said blade means having a first end spaced from said axis a greater distance than the opposite end and being fixedly connected to said mounting portion only in the region of said first end so that the remainder of each blade means located inwardly of siad connected end may freely resiliently flex in the direction toward and substantially into contact with a flexed portion of the adjacent blade means upon increase of the speed of rotation of the mounting portion about said axis to thereby reduce the cross-sectional area of each passage.

2. A fan blade assembly as defined in claim 1, wherein said mounting portion comprises a plate having a flat surface, each of said blade means including an angle less than 90° with said flat surface and being integrally connected in the region of said first end thereof to said plate, said plate and said blade means being formed from plastic material.

3. A fan blade assembly as defined in claim 1, wherein said blade means are arranged with respect to each other in such a manner that said opposite end of each blade means will flex, upon increase of the speed of rotation of said mounting portion, toward a portion of the adjacent blade means which will likewise resiliently flex toward a corresponding portion of the next adjacent blade means.

4. A fan blade assembly comprising a mounting portion having an axis of rotation and being rotatable in a predetermined direction; and a plurality of blade means arranged spaced from each other about said axis of rotation and defining between each pair of adjacent blade means a passage for air passing therethrough, each of said blade means comprising a pair of substantially straight blades which are deflectable in response to rotation of said mounting means, each blade of a corresponding pair forming a leg of V-shaped configuration, one blade of each pair defining a front blade relative to the other blade comprising the pair and to the direction of rotation, each blade having a free end in the region of the vertex of a corresponding V-shaped configuration and having an opposite end spaced further from said axis of rotation than said free end and being connected to said mounting portion, the free end of each front blade bearing against the other blade of the corresponding pair and moving along said other blade towards the connected end thereof in response to rotation of said mounting portion to thereby reduce the cross-sectional area of each passage.

5. A fan blade assembly as defined in claim 1, wherein said blade means are made from an elastic plastic.

6. A fan blade assembly as defined in claim 1, wherein said blades are positioned at lagging angles relative to radial lines through said first ends, at all speeds of rotation of said mounting portion.

7. A fan blade assembly as defined in claim 1, wherein said opposite ends are rigidly fixed to said mounting portion along a distance equal to about one-fourth to one-third of the length of said blades.

8. A fan blade assembly as defined in claim 1, further comprising an annular disk connected to said mounting portion and rotatable therewith, said blade means being positioned between said mounting portion and said annular disk and connected to each.

9. A fan blade assembly as defined in claim 8, further comprising spacers separating said mounting portion and said annular disk, said annular disk being connected with fastening members passing through said spacers.

10. A fan blade assembly as defined in claim 9, wherein said fastening members comprise screws.

11. A fan blade assembly as defined in claim 9, wherein said fastening members comprise rivets.

12. A fan blade assembly as defined in claim 1, wherein said blade means comprises longitudinal blades; and further comprising means for covering at least a portion of said blades.

13. A fan blade assembly as defined in claim 12, wherein said means for covering said blades comprises an annular disk mounted in spaced relation to said mounting portion.

14. A fan blade assembly as defined in claim 1, wherein said mounting portion comprises a substantially flat portion and said blade means comprise substantially flat blades mounted on said flat portion and forming angles less than 90° therewith.

15. A fan blade assembly as defined in claim 1, wherein said blade means are integral at said first end with said mounting portion.

* * * * *